G. F. Fessenden,
Rolling Pin.
N° 62,323. Patented Feb. 26, 1867.
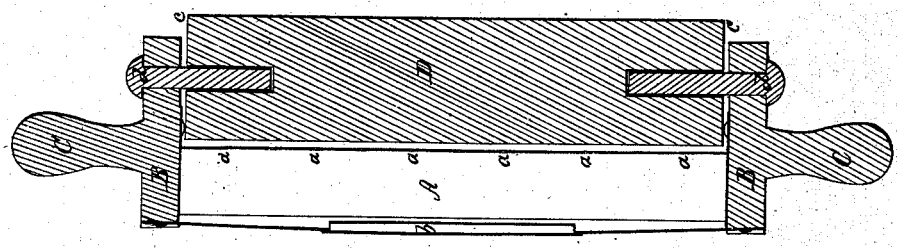
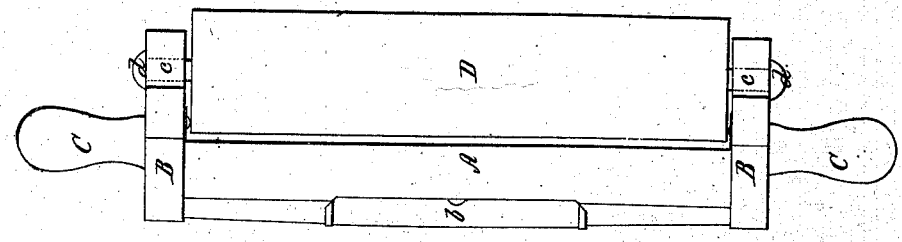
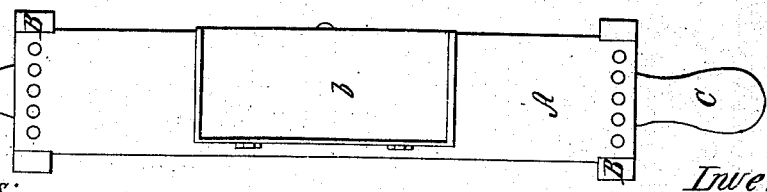
Witnesses:
Inventor:
George F. Fessenden
by his attorney

United States Patent Office.

GEORGE F. FESSENDEN, OF WEST CAMBRIDGE, MASSACHUSETTS.

Letters Patent No. 62,323, dated February 26, 1867.

---

IMPROVED APPARATUS FOR ROLLING AND SPREADING DOUGH.

---

The Schedule referred to in these Letters Patent and making part of the same.

---

TO ALL PERSONS TO WHOM THESE PRESENTS SHALL COME:

Be it known that I, GEORGE F. FESSENDEN, of West Cambridge, of the county of Middlesex, and State of Massachusetts, have invented a new and useful Apparatus for Rolling or Spreading and Flouring Dough; and I do hereby declare the same to be fully described in the following specification, and represented in the accompanying drawings, of which—

Figure 1 is a top view.
Figure 2, a front elevation.
Figure 3, an end view.
Figure 4, a transverse section; and
Figure 5, a longitudinal section of it.

In such drawings, A is a long box, which may be made of tin, and should have its bottom perforated with numerous holes, as shown at $a\ a\ a$. It should also have an opening in its top, provided with a cover, $b$. From the opposite ends of the said box, I project downward two brackets B B, each of which I provide with a handle, C, to extend from it in manner as represented. The said brackets are to be arranged at right angles with the bottom of the box, and are to be provided with bearings or holes $c\ c$, to receive the journals $d\ d$ of a "rolling-pin" or roller D, to be arranged beneath the box A, and to be capable of freely revolving on the pin. The invention is what may be termed the combination of a "rolling-pin" and "dredging-box." The handles of the rolling-pin, instead of being projected directly from its ends, are extended from the brackets, in consequence of which a person, by taking hold of the handles, will be able to support both the dredging-box and the roller at once, and to use the roller for rolling out or spreading a mass of dough. The dredge-box is for the purpose of flouring the roller to prevent the dough from adhering to such roller while it may be in use. The movements of the roller on the dough while spreading it, or with respect to it, will cause flour when in the box A to drop through its bottom on the surface of the roller to such extent as may be desirable. I have contemplated the application of a gate to the bottom of the box, to be moved in one direction by a cam on the roller journal, and in the other by a spring, the same being to cause the flour to be discharged only when the openings of the hole are uncovered by the gate; but this I do not consider to be of any material advantage.

I claim the combination and arrangement of the dredge-box and roller or rolling-pin.

I also claim the combination as well as the arrangement of the dredge-box, the brackets, the handles, and the roller or rolling-pin, as described.

G. F. FESSENDEN.

Witnesses:
R. H. EDDY,
F. P. HALE, Jr.